UNITED STATES PATENT OFFICE.

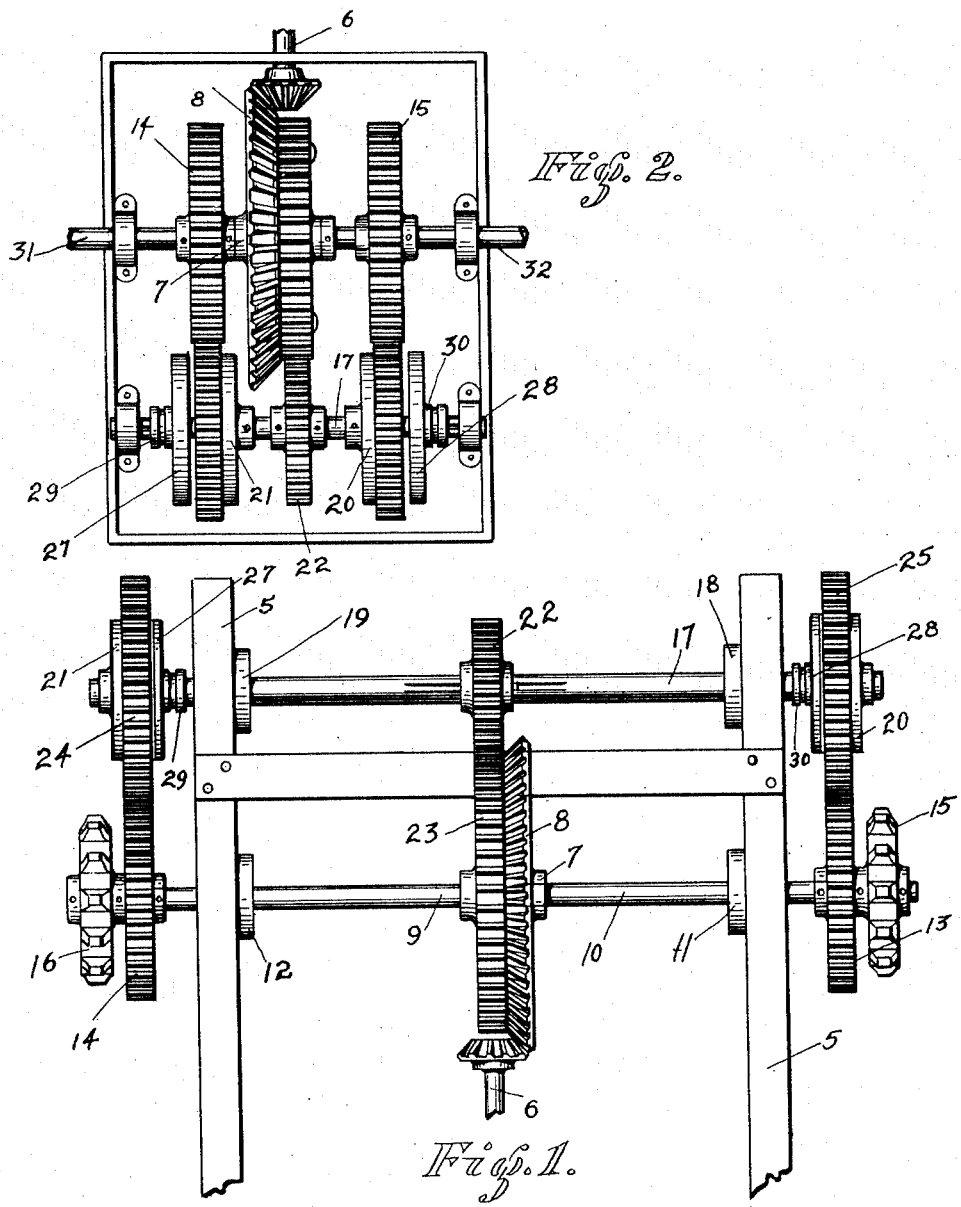

ALBERT L. KINS, OF FARMINGTON, CALIFORNIA, ASSIGNOR OF ONE-HALF TO LLOYD H. HOUSTEN, OF FARMINGTON, CALIFORNIA.

TRACTOR.

1,388,578.  Specification of Letters Patent.  Patented Aug. 23, 1921.

Application filed March 31, 1919. Serial No. 286,437.

*To all whom it may concern:*

Be it known that I, ALBERT L. KINS, a citizen of the United States, and a resident of the city of Farmington, county of San Joaquin, State of California, have made a new and useful invention—to wit, an Improvement in Tractors; and I hereby declare the following to be a written description of the same in such full, clear, concise, and exact terms as to enable any person skilled in the art to which it appertains or to which it is most nearly connected to make, construct, and use the same.

This invention relates to a new and useful improvement in automobile and tractor driving mechanism and is particularly adapted to tractors of the self-laying track type.

The object of this device is to provide means for turning a vehicle without the loss of power.

Another object is to provide a very inexpensive mechanism which will accomplish the results desired, and at the same time will be practically free from excessive wear due to the sand and like dirt which is common upon vehicles of the tractor type, it being known that they are used in soft dirt and sand.

Another object is to provide a structure which is cheap to manufacture.

A still further object is to make a drive device which is practically fool proof in operation.

Still another object is to have all parts easily accessible for the purpose of repair or adjustment.

Referring to the drawings:

Figure 1 is a top plan view diagrammatically showing the arrangement of essential parts.

Fig. 2 is a diagrammatic plan view of a gear arrangement for accomplishing the same purposes.

The numeral 5 designates the frame of a vehicle which is of the usual construction, and carries thereon a power mechanism such as an internal combustion engine, which, for obvious reasons, is not shown. The power is transmitted to the propelling mechanism of the vehicle which may be either wheels or a self-laying track common in caterpillar tractors through the medium of a propeller shaft 6 which drives the usual differential 7 through the medium of the master gear 8. This differential 7 and master gear 8 are mounted upon a split shaft 9—10, which split shaft is journaled in suitable bearings 11 and 12 upon the frame 5.

At the outer ends of this shaft are carried driving members 13 and 14, which driving members are attached to sprockets 15 and 16, which sprockets transmit power to self-laying track members, not shown. It is obvious that road wheels may be attached in place of these sprockets. Carried at the rear end of the frame is a shaft 17 parallel to the split shaft 9—10. This shaft is suitably journaled as at 18 and 19 to the frame 5, and carries at its outer end friction disk members 20 and 21. These members are pinned to this shaft and rotate therewith. Rotation is imparted to this shaft by means of a gear 22, which meshes with a gear 23 rigidly attached to the master gear 8. This gear 22 is shown for the purpose of illustration, as being one half the diameter of the gear 23, which will result in an increased speed being transmitted to the shaft 17.

It is understood, however, that the gear ratio may be changed to accomplish the results desired.

Upon the outer ends of this shaft 17 and adjacent the friction disks 20 and 21, I provide floating gears 24 and 25, which floating gears are in constant mesh with the gears 13 and 14. These gears 24 and 25 are smaller in diameter than the gears 13 and 14, the purpose of which will be hereinafter described.

The numerals 27 and 28 refer to friction disks mounted upon the shaft 17 with their friction faces toward the gears 24 and 25. These friction members carry grooved collars 29 and 30 through the medium of which said disks 27 and 28 may be moved into contact with the gears 24 and 25 compressing the same against the friction members 20 and 21. These friction members 27 and 28 are slidably keyed upon this shaft 17. It will be noted that rotation will thus be imparted to the gears 24 and 25.

In Fig. 2 I have shown the same construction arranged within a gear box wherein the shafts 31 and 32 transmit the power to the point where it is to be used.

The operation of my improved drive is as follows: Assuming that the engine is driven at any desired speed, rotation will be imparted to the master gear 8 which will cause rotation of the gears 13 and 14 through the differential 7. At the same time rotation will be given the shaft 17 through the action of the gears 22 and 23, the shaft 17 revolving at twice the speed of the shaft 9.

Now, assuming that it is desired to turn the vehicle for the purposes of illustration to the left of the drawing, the disk 28 is moved through the medium of the collar 30 into contact with the gear 25, which imparts rotation thereto. This will cause increased speed of rotation of the gear 13 with the driving mechanism connected thereto, which, as before mentioned, may be a road wheel or sprocket. This increased rotation of the gear 13 and shaft 10 will operate through the differential and result in the relative retardation of the gear 14. This results in applying substantially 75 per cent. of the power to one side of the machine and 25 per cent. to the other side, thereby utilizing all of the power in making a turn without applying a brake to one side as is common practice.

With this construction, I am also enabled to turn in a circle rather than at right angles as is now done by most machines of this type.

Having thus described my invention, what I claim as new and desire to secure by Letters Patent is:

In a motor propelled vehicle, a pair of driving shafts each adapted to operate a driving wheel or the like, a differential mechanism between said shafts, power means actuating said differential a secondary shaft parallel with said driving shafts and driven by said differential a gear train from each of said driving shafts to gears loosely mounted on said secondary shafts, and independent clutch means between said secondary shaft and said loosely mounted gears, as and for the purpose set forth.

In testimony whereof, I have hereunto set my hand at San Francisco, California, this 18th day of March, 1919.

ALBERT L. KINS.

In presence of—
 BRADLEY L. BENSON,
 P. S. PIDWELL.